April 19, 1938.     K. NAGAI     2,114,398
CONVERTIBLE HAND TRUCK
Filed March 1, 1937
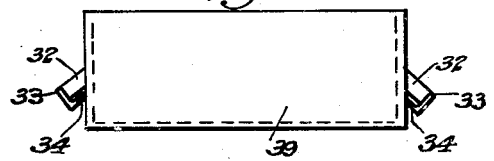
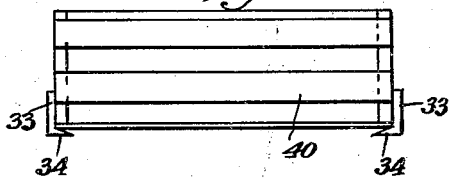
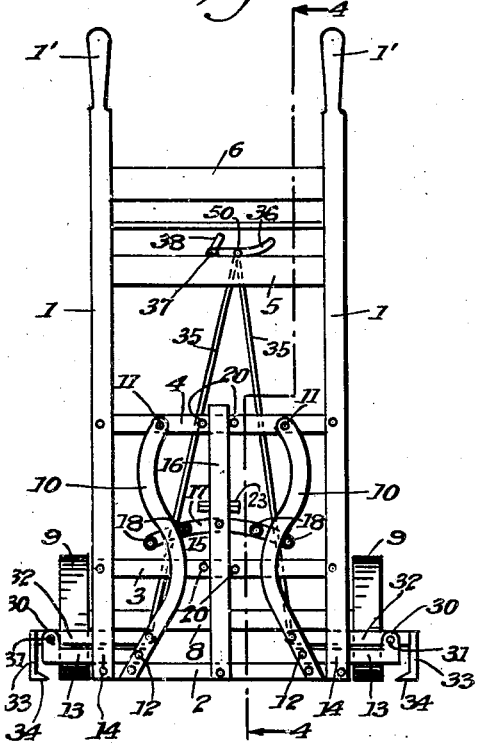
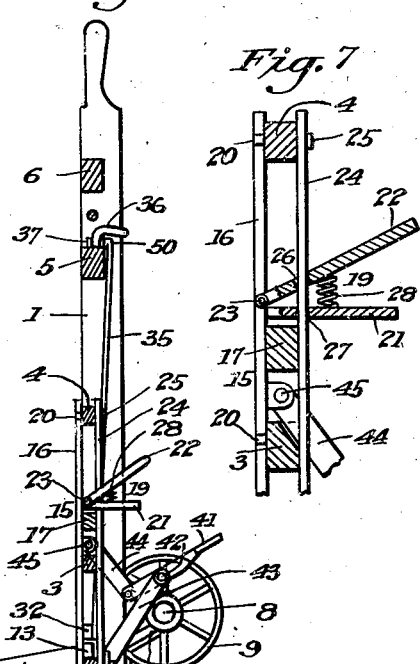
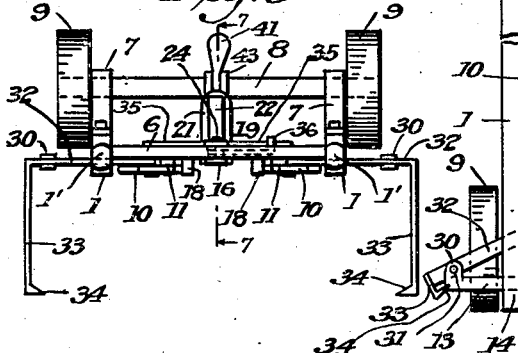
INVENTOR:
KIYOSHI NAGAI,
BY Alan Franklin
ATTORNEY.

Patented Apr. 19, 1938

2,114,398

UNITED STATES PATENT OFFICE 2,114,398

CONVERTIBLE HAND TRUCK

Kiyoshi Nagai, Los Angeles, Calif.

Application March 1, 1937, Serial No. 128,404

7 Claims. (Cl. 214—65.5)

This invention relates to hand trucks for gripping and conveying boxes or crates.

Two kinds of hand trucks are at present in use, one for gripping and transporting boxes which are called "lugs" and the other for gripping and transporting crates, in which boxes and crates are packed fruit, such as oranges, lemons or the like, or other merchandise.

The general object of my invention is to provide a convertible hand truck, which, by means of a simple mechanism, may be readily converted from a box truck into a crate truck, or vice versa.

A more particular object is to provide a hand truck with a pair of slidably mounted prong levers, and means for swinging said levers into such position that the prongs thereof may be projected upwardly at an angle into the ends of a box or projected under the bottom of a crate, at the ends thereof, for lifting the box or crate, on the truck, to be transported by the truck.

Other objects and advantages will appear hereinafter.

The invention is illustrated in the annexed drawing which forms a part of this specification and in which, Fig. 1 is a front view of a box or "lug" with the lever prongs of my truck shown projected upwardly at an angle into the ends of said box or lug for lifting the same onto the truck.

Fig. 2 is a front view of a crate with the lever prongs of my truck shown projected under the bottom of said crate at the ends thereof for lifting said crate onto the truck.

Fig. 3 is a front elevation of my truck, with the prong levers in position for projecting their prongs under the ends of a crate.

Fig. 4 is a side elevation of my truck as shown in Fig. 3.

Fig. 5 is a plan view of my truck as shown in Fig. 3.

Fig. 6 is a view like Fig. 3, but with the gripping levers positioned for gripping the ends of a box.

Fig. 7 is a fragmentary sectional view taken on the line 7—7 of Fig. 5 of the locking lever and slide bar.

Referring in detail to the drawing, in which corresponding parts are designated by the same reference characters in all of the figures, 1 designates the side bars formed with handles 1' at their rear ends; 2, 3, 4, 5 and 6 the connecting bars connecting said side bars; 7 the axle bearing brackets secured to the rear edges at the forward ends of said side bars; 8 the axle journaled in said bearing brackets; and 9 the wheels secured on the ends respectively of said axle, of a conventional hand truck, said side bars 1 and connecting bars 2 to 6 inclusive forming the frame of the truck.

A pair of cam links 10 are pivoted at their upper ends at 11 to said connecting bar 4 of the truck, and are pivotally connected at their lower ends, at 12, to the inner ends of a pair of slides 13 respectively, which slides are slidably mounted in bearings 14 respectively on the forward edges of the truck side bars 1, at the lower ends of said side bars, with the outer ends of said slides extending beyond the outer sides of said bars respectively. Means 15 are provided for swinging the cam links 10 on their pivots 11 to move the slides 13 inwardly or outwardly with relation to the truck side bars 1, which means includes a slide bar 16 extending over the forward side of the connecting bars 3 and 4, a crosshead 17 on which two pairs of rollers 18 are journaled, and a locking device 19 for said slide bar, said cam links extending respectively between said pairs of rollers. Guide pins 20 are secured in the connecting bars 3 and 4 adjacent the side edges of the slide bar 16 for guiding said bar in its vertical sliding movement. The locking device 19 includes a fixed arm 21 secured to the slide bar 16 and extending rearwardly therefrom at right angles thereto, a locking lever 22 pivoted at its forward end, at 23, to said slide bar 16, a lock bar 24 secured at its upper end at 25 to the rear side of the connecting bar 4 and extending through openings 26 and 27 in the locking lever 22 and fixed arm 21, and a spring 28 between said fixed arm and said locking lever for normally holding said lever away from said arm in an inclined position to the lock bar 24, so that the upper rear edges and the lower forward edge of the lever opening 26 will bind against the rear and forward sides, respectively, of said lock bar, and lock the slide bar 16 and cross head 17 at any position between the extremes of movement of said slide bar and cross head, whereby the slides 13 are locked in any suitable position between their extremes of movement.

On the upper edges at the outer ends of the slides 13 are formed ears 30 to which are pivoted, by pivots 31, near their outer ends, a pair of prong gripping levers 32 respectively, formed at their outer ends with depending and forwardly extending prong arms 33 respectively, at the forward ends of which arms are formed inwardly extending prongs 34 respectively. To the inner ends of said gripping levers 32 are connected one end of a pair of rods 35 respectively the other ends of which rods are connected to a lock lever 36, pivoted, at 37, to the upper edge of the connecting bar 5, which lever is formed with a short angular rest arm 38, for engaging the upper edge of said connecting bar, when said lever is swung up and over its dead center to the left (Fig. 6), for locking the gripping levers 32 swung upwardly from their inner ends, with the prongs 34 of said gripping levers inclined upwardly for projecting into the ends of a box 39, as illustrated in Fig. 1. When the lock lever 36 is swung down to the right it rests against the upper edge of the connecting bar 5 (Fig. 1) so that the gripping levers 32 and their prongs 34 rest in a horizontal position to be projected under the bottom of a crate 40 at the ends thereof, as illustrated in Fig. 2.

A foot pedal 41 is secured on a rock shaft 42 journaled at its ends in arms 43 projecting from the bearing brackets 7, and the forward end of said lever is connected to one end of a link 44, the other end of which link is connected at 45 to the slide bar 16.

The operation, uses and advantages of my invention are as follows:

To grip and lift a crate 40, the parts of my truck being in the position shown in Figs. 3 and 4, the operator, grasping the handles 1', rolls the truck on its wheels 9 into a position at one side of the crate, with the prong arms 33 and their prongs 34 beyond the ends respectively of the crate, whereupon the operator swings the truck on its wheel axle 8 into vertical position, with said prongs 34 resting upon the ground or floor upon which the crate rests. The operator then depresses, with one foot, the pedal 41 which through link 44, moves the slide bar 16 and cross head 17 upwardly, the rear upper edge and the lower forward edge of the opening 26 engaging respectively the rear and forward sides of the lock bar 24 and swinging the locking lever 22 downwardly against the spring 28 and allowing said lock bar to pass freely through said opening. Said upward movement of the cross head causes the two outer rollers 18 on said cross head to engage the outer cam edges of the cam links 10, respectively, and swing said links on their pivots 11 inwardly or towards each other, which movement of the cam links draws the slides 13 and prong levers 32 inwardly and the prongs 34 under the bottom of the crate, until the prong arms 33 engage the ends respectively of the crate, as illustrated in Fig. 2 of the drawing, whereupon upward movement of the cross head and slide bar 16 is arrested and the spring 28 swings the locking lever 22 upwardly and causes the lower forward edge and the upper rear edge of the opening 26 to bind against the forward and rear sides respectively of the lock bar 24 and locks the slide bar 16 and cross head 17 in their raised position and the prong arms 33 against the ends of the crate with the prongs 34 under the bottom of the crate. Other crates may then be stacked upon said crate until the truck is loaded. The operator, by means of the handles 1', then swings the truck down rearwardly on its wheel axle 8 and pushes the truck along to its place for unloading said crates from the truck, whereupon the operator then swings the truck upwardly into vertical position until the prongs 34 rest upon the ground or floor. The operator then depresses, with one foot, the locking lever 22, which releases the lower forward edge and the upper rear edge of the opening 26 from the forward and rear sides respectively of the lock bar 24, and forces the slide bar 16 and cross head 17 downwardly, whereupon the inner rollers 18 on said cross head engage the inner edges of the cam links 10 and force said links outwardly or away from each other on their pivots 11, which forces the slides 13 and gripping prong levers 32 outwardly, until the prong arms 33 are withdrawn from the ends of the crate and the prongs 34 withdrawn from under the crate. The truck may then be withdrawn rearwardly from the stack of crates which are left standing on the floor or ground.

When it is desired to use the truck for gripping and transporting boxes or lugs 39, the lock lever 36 is first swung upwardly or counter-clockwise (Fig. 3) until the point of connection 50 of the upper ends of the rods 35 to said lever passes to the left over the lever pivot 37, or over the dead center, and the rest arm 38 of said lever rests upon the upper edge of the connecting bar 5, during which movement of said lock arm the gripping prong levers 32 are swung clockwise by the rods 35 into an inclined position with the prongs 34 inclined upwardly, as illustrated in Fig. 6 of the drawing in which position said levers and prongs are locked by the lock lever 36 in its position with its rest arm engaging the upper edge of the connecting bar 5. The truck is then brought into a vertical position adjacent one side of the box 39 with the prong arms 33 and their prongs 34 beyond the ends of said box. The gripping prong levers 32 are then moved inwardly, as hereinbefore described, upon depressing the pedal 41, until the prongs 34 are projected upwardly at an incline into the ends of the box, as illustrated in Fig. 1 of the drawing. Other boxes may then be stacked upon said box 39 and the boxes transported by the truck to the place of unloading. The gripping prong levers 32 and their prongs 34 are then withdrawn outwardly from the ends of the box, upon depressing the locking lever 22, as hereinbefore described, and the truck moved rearwardly from the boxes, leaving the boxes stacked upon the ground or floor at the place of unloading.

By swinging the lock lever 36 to the right or left, my truck may be converted from a box truck to a crate truck or from a crate truck to a box truck.

I claim:

1. In a hand truck, gripping members mounted on said truck for gripping the ends of a box or for extending under the bottom of a crate, and means for actuating said gripping members.

2. In a hand truck, a pair of gripping members, means for mounting said gripping members on the truck to be moved away from each other or moved toward each other for gripping a box or for extending under and gripping a crate, and means for actuating said gripping members.

3. In a hand truck, a pair of gripping members, means for mounting said gripping members on the truck to be moved away from each other or towards each other, prongs on said gripping members, means for positioning said gripping members to enable said prongs to be projected upwardly at an incline into the ends of a box or projected straight under the bottom of a crate, and means for moving said gripping members toward each other in either of said positions for gripping a box or a crate.

4. In a hand truck as characterized by claim 3, means for locking said gripping members while gripping either a box or a crate.

5. In a hand truck, a pair of slides mounted on said truck at opposite sides thereof, means for moving said slides outwardly or inwardly with relation to the sides of the truck, gripping prong levers pivotally mounted on said slides respectively, and means for swinging said levers to position the prongs thereof for engaging the ends of a box or for extending under the bottom of a crate, when said slides are moved inwardly with relation to the sides of the truck.

6. In a hand truck, a pair of slides mounted on said truck at opposite sides thereof, means for moving said slides outwardly or inwardly with relation to the sides of the truck, gripping prong levers pivotally mounted on said slides respectively, links connected at one end to said levers, a lock lever pivoted on said truck and connected to the other ends of said links for swinging said gripping prong levers to position the prongs thereof for engaging the ends of a box or for extending under the bottom of a crate, said lock lever being formed with a rest for engaging the truck when said lever is swung up and the point of connection of said rods, to said lever has swung over the pivot of the lever, for locking said gripping prong levers in position for their prongs to engage the ends of a box, and said lock lever being mounted to engage the truck when swung down for positioning said gripping prong levers in position for their prongs to extend under the bottom of a crate.

7. In a hand truck, a pair of gripping levers mounted on the truck to be moved inwardly or outwardly with relation to the sides of the truck, a slide bar mounted on the truck, means actuated by movement of said slide bar in one direction or the other for moving said gripping levers inwardly or outwardly as aforesaid, a lock bar mounted on the truck, an arm fixed on said slide bar and provided with an opening through which said lock bar extends, a locking arm pivoted to said slide bar and provided with a slot through which said lock bar extends, and a spring for normally holding said locking arm in position with edges of its slot engaging said lock bar for locking said slide bar against movement in one direction and thereby locking said gripping levers in position for gripping a box.

KIYOSHI NAGAI.